United States Patent [19]

Lewis

[11] Patent Number: 5,375,773
[45] Date of Patent: Dec. 27, 1994

[54] SALT SPREADER MOUNTING ASSEMBLY

[76] Inventor: J. Harry Lewis, 68 Glass Avenue, London, Ontario, Canada, N5W 1Z7

[21] Appl. No.: 114,827

[22] Filed: Sep. 2, 1993

[51] Int. Cl.⁵ .......................... E01C 19/20; B60R 9/06
[52] U.S. Cl. .................................... 239/650; 239/687; 224/42.03 A
[58] Field of Search ............... 239/650, 651, 661, 663, 239/681, 687; 296/117, 50-55; 224/42.03 R, 42.03 A, 42.06, 42.07, 42.08

[56] References Cited

U.S. PATENT DOCUMENTS

| 2,506,849 | 5/1950 | Winterton | 296/51 |
| 4,166,581 | 9/1979 | Hetrick | 239/687 |
| 4,221,311 | 9/1980 | Penn | 224/42.03 R |
| 4,282,994 | 8/1981 | Hilliard | 224/42.06 |
| 4,753,376 | 6/1988 | Tulio | 224/42.03 R |

FOREIGN PATENT DOCUMENTS

| 68475 | 5/1980 | Japan | 296/50 |
| 111223 | 11/1917 | United Kingdom | 296/50 |

Primary Examiner—Karen B. Merritt
Attorney, Agent, or Firm—R. Craig Armstrong

[57] ABSTRACT

A salt spreader mounting assembly that attaches to the rear of a utility vehicle such as a conventional pick-up truck is described. The salt spreader mounting assembly includes a frame which attaches to the vehicle, and pivoting connections between the frame and the vehicle such that the frame can swing horizontally thereby permitting access to the rear of the vehicle, without interference with the tailgate. The frame supports a compatible salt spreader/hopper unit. The assembly allows a combination spreader/hopper to be swung away from the vehicle from at least one of its sides, thereby allowing direct access to the rear cargo area via the tailgate. The assembly is easily installed or removed and requires limited modification to the vehicle.

3 Claims, 7 Drawing Sheets

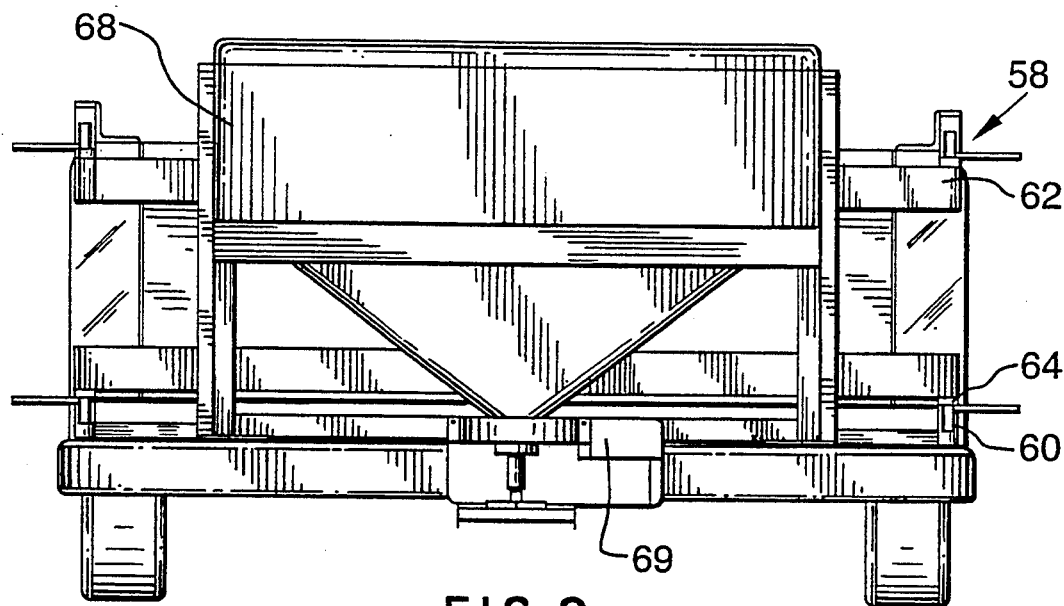
FIG.9.
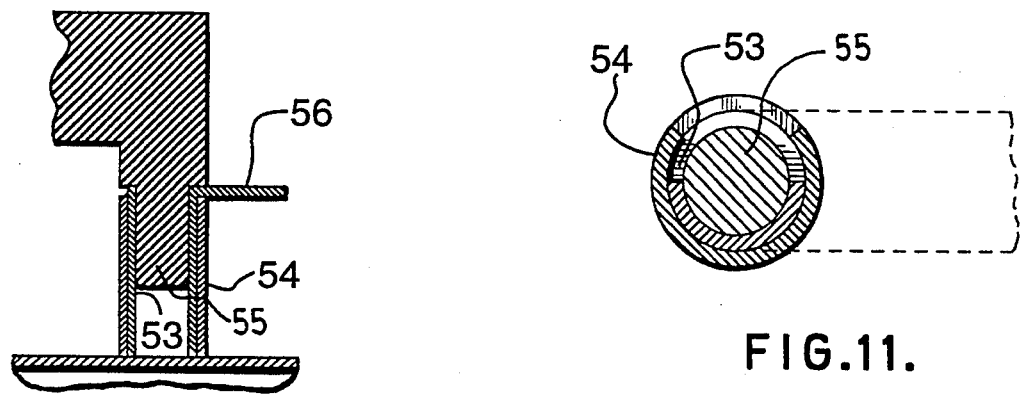
FIG.10.
FIG.11.
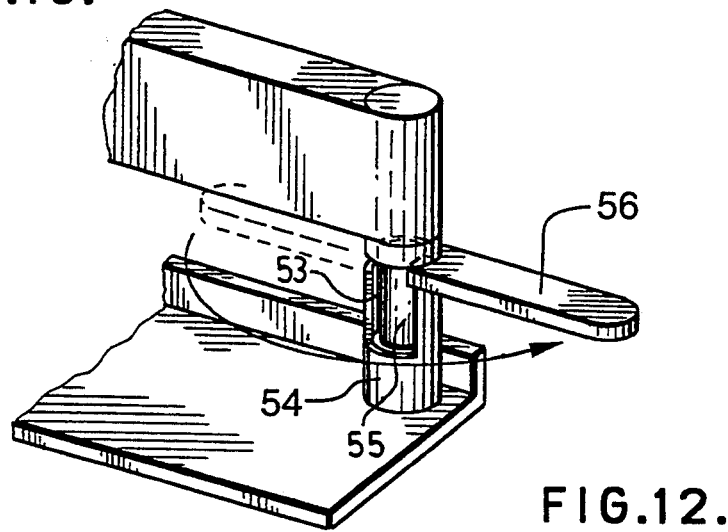
FIG.12.

SALT SPREADER MOUNTING ASSEMBLY

BACKGROUND OF THE INVENTION

1. Field of the invention

The invention relates to an improved vehicle mounting assembly for a combination salt spreader and hopper. The assembly's intended use is for utility vehicles such as pick-up trucks. The mounting assembly is designed to allow the spreader/hopper to swing from either side of a truck bed side wall for the purpose of allowing full access to the rear of the vehicle's cargo bed via the tailgate.

2. Description of the Prior Art salt spreading is a general requirement of winter road maintenance in many areas. Over the years, private business has become involved in road and driveway maintenance in the form of snow removal and salt spreading. Private business commonly uses pick-up trucks to perform this type of work. In the past, numerous types of salt spreaders have been developed to be attached to these conventional type vehicles. Thus, there is a need for affordable salt spreaders which are compatible with conventional light and heavy duty pick-up trucks.

In the past, salt spreader mounting assemblies used in conjunction with pick-up trucks have fastened onto the truck's rear bumper or tailgate. The usual procedure is that at the beginning of the winter season these devices are secured to the truck in a fixed position by means of a system of bolts. Because of the relative difficulty in installing the assemblies they are often left on all winter, not being removed until the spring season. Other more temporary devices for the same intended purpose do exist, one type having arms that slide over the tailgate and rest on the vehicle's bumper.

When installed, both the "bolt-on" and "slide-on" configurations restrict access to the rear of the vehicle's cargo box via the tailgate. If removal is required or desired, the bolt-on system must be unbolted and the slide-on system must have its hopper emptied so that it can be lifted off, as a typical load of salt would weigh several hundred pounds. Obviously, both methods require considerable labor and expense to simply gain access to the cargo bed for loading or unloading. The end result is that these systems are typically left on the vehicle all winter, and if access is desired to the cargo bed it has to be over the side wall of the vehicle.

As a result these conventional salt spreader mounting assemblies require operators to lift cargo, namely bags of road salt, up over the side walls of the truck bed manually. This results in additional labor costs, inconvenience and possible injury. The restricted access to the cargo bed also reduces the convenience and utility of owning a vehicle with a rear entry cargo bed. Thus, there is a need for a salt spreader mounting assembly that will allow relatively easy access to the rear of the vehicle's cargo area.

SUMMARY OF THE INVENTION

It is therefore an object of the invention to provide a salt spreader mounting assembly with the ability to allow quick and easy access to the rear cargo area of a utility vehicle.

It is a further object of the invention to provide a salt spreader mounting assembly that is easily installed or removed, requiring limited modification to the vehicle itself.

In the invention, a salt spreader mounting assembly attachable to the rear of a vehicle is comprised of a framer a means for attaching the frame to the vehicle, and a pivoting means such that the frame can swing horizontally thereby permitting access to the rear of the vehicle.

Since the invention allows the combination spreader/hopper to swing out of the way, full pallets of cargo, whether road salt or something else, can be lifted and loaded onto the rear of the truck using a fork lift or any other suitable means. Additional utility and convenience are therefore provided.

The present invention is also configured so that almost all of its components can be entirely removed from the vehicle in a quick and simple fashion. Accordingly, when the salt spreader is only needed occasionally, as in more temperate areas, or at the beginning and end of the season, the vehicle does not have to carry the entire weight of the assembly when it is not needed. Again, convenience and utility of the vehicle for other functions is increased, as well as making the vehicle more aesthetically pleasing. Furthermore, the vehicle consumes less fuel and safety is enhanced as rear vision is less obstructed.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 9 is a rear view of another embodiment showing a second alternative pivoting mechanism;

FIG. 10 is a sectional front view of the pivoting mechanism of the embodiment shown in FIG. 9;

FIG. 11 is a sectional top view of the pivoting mechanism of the embodiment shown in FIG. 9 in an unlocked position; and FIG. 12 is a perspective view of the pivoting mechanism of the embodiment shown in FIG. 9 in an unlocked position.

DETAILED DESCRIPTION OF THE PREFERRED EMBODIMENTS

Figure 1:
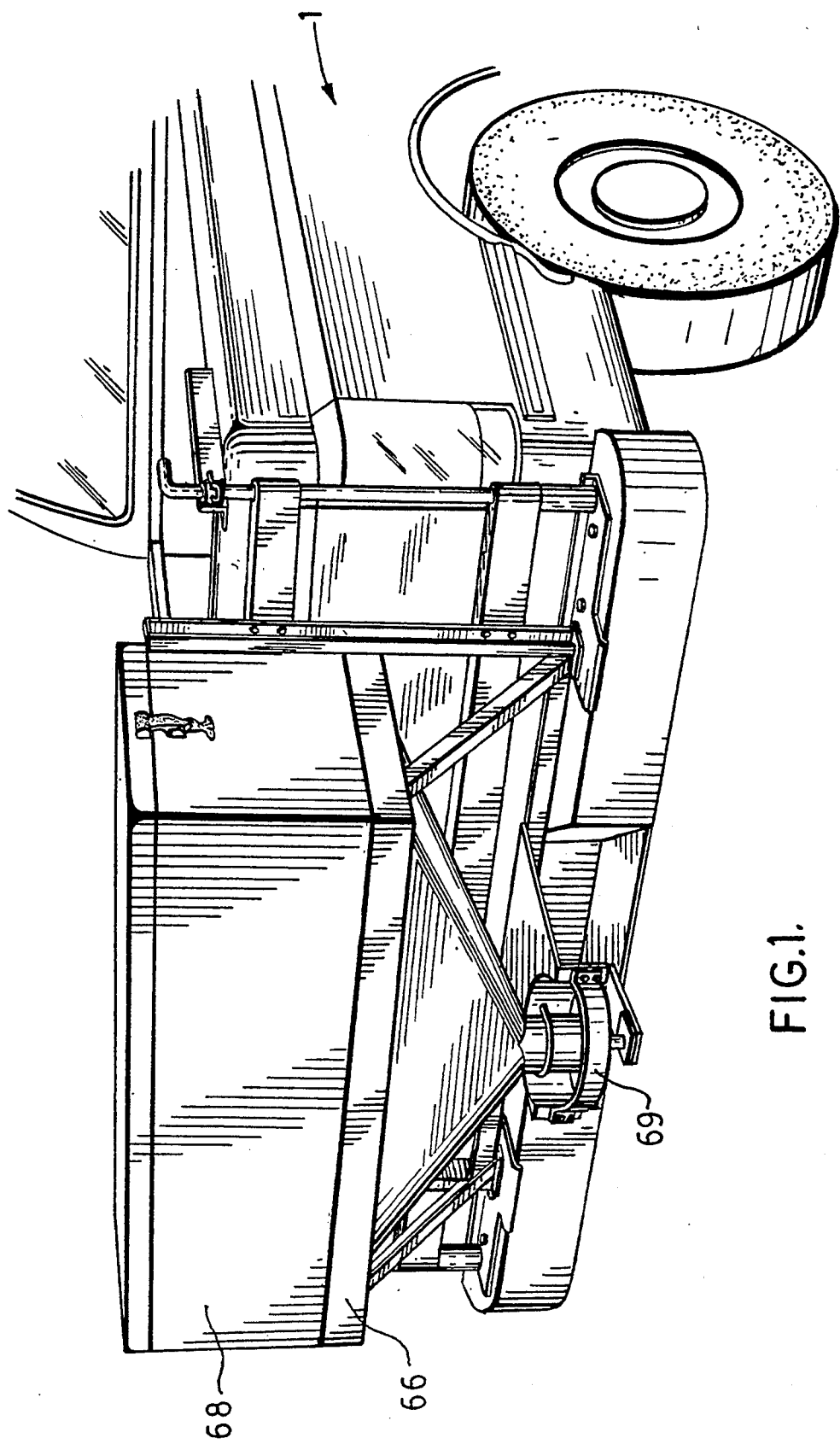
FIG. 1 is a perspective view of the mounting assembly and hopper attached to a vehicle.
Figure 5:
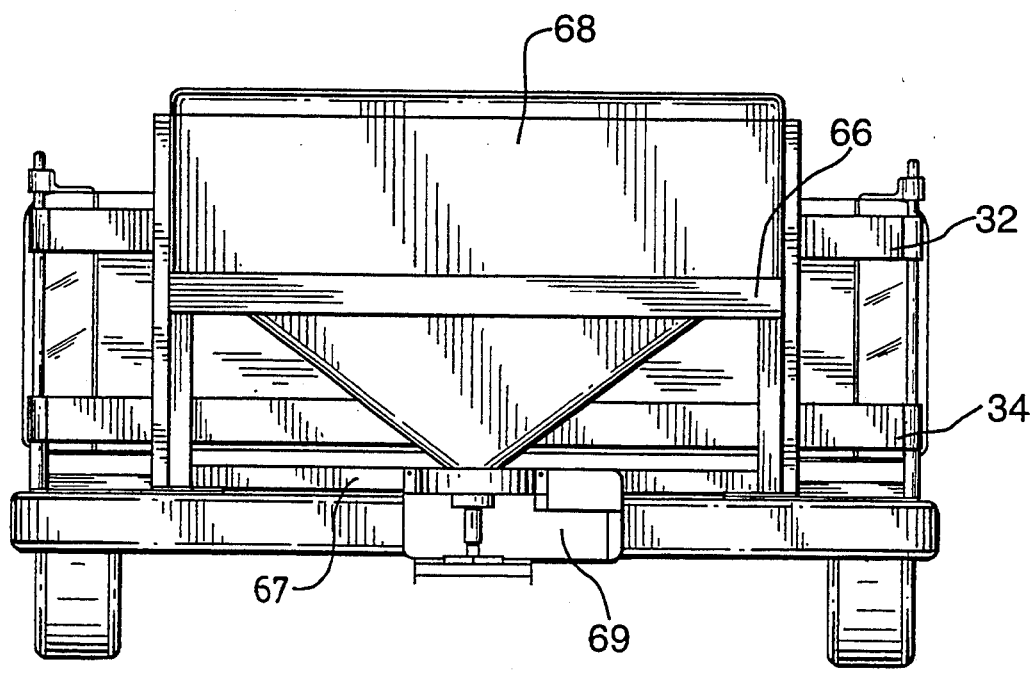
FIG. 5 is a rear view of the mounting assembly with the hopper and spreader attached to a vehicle.
Figure 6:
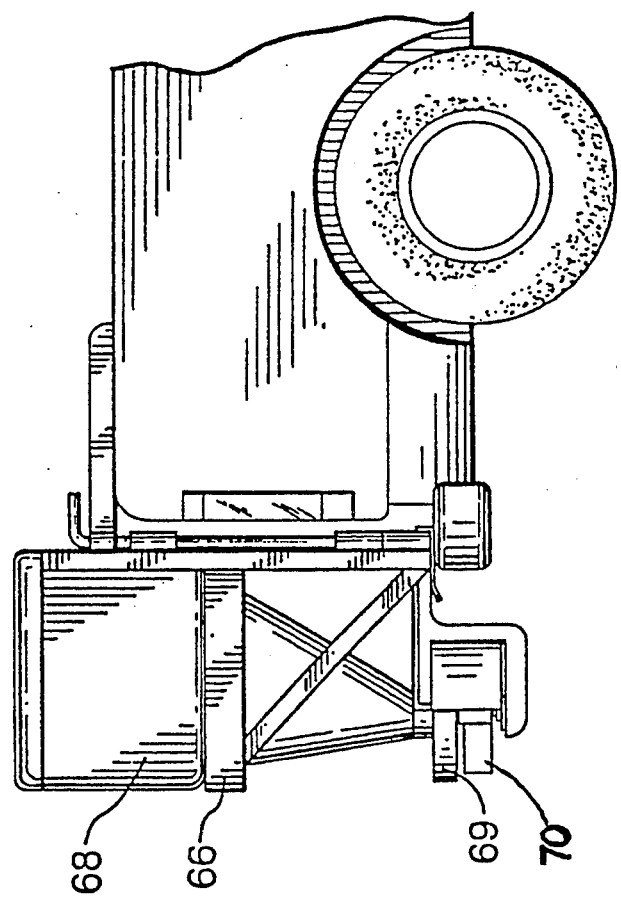
FIG. 6 is a side view of the mounting assembly with the hopper and spreader attached to a vehicle.

Referring to FIGS. 1, 5 and 6, it can be seen that the salt spreader mounting assembly accommodates a typical combination salt hopper and spreader. The details of the fairly generic hopper and spreader will not be described in great detail. The hopper 68 has a motorized spreader integrated into one contained unit. The hopper is generally funnel-shaped and includes a removable top lid for filling. An electric motor is contained in the lower portion which drives the spreader. The spreader has an external spinner unit mounted at the base of the hopper which is driven by the contained electric motor. The salt hopper, electric motor and spreader form one unit which is configured to fit directly onto a co-operating salt spreader mounting assembly described herein.

The mounting assembly has several distinct components, including a frame 66, a vehicle attachment means, and a pivoting or hinging mechanism.

Figure 3:
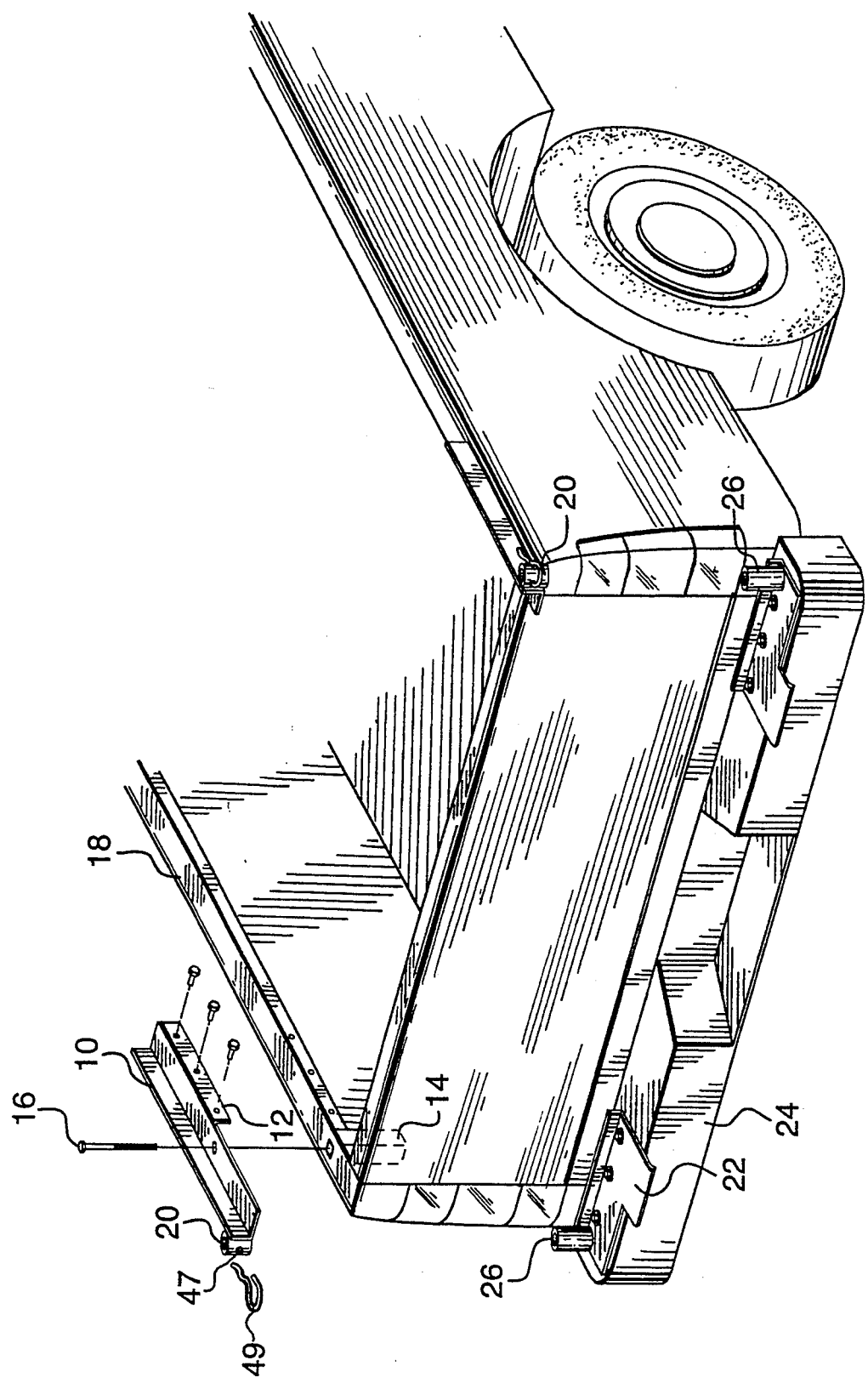
FIG. 3 is a perspective view of the mounting assembly vehicle attachment means.

Referring to FIG. 3, it can be seen that the vehicle attachment means consists of two identical upper mounting plates 10 attachable to the vehicle sidewall 18, and two identical lower mounting plates 22 attachable to the vehicle bumper 24. The upper mounting plates are made from elongated angle iron and have an attachment lip 12 that extends downwardly at a right angle along the inside of the sidewall. The attachment lip travels only a partial length of the mounting plate 10 so as not to interfere with the latching of the tailgate. The length is sufficient to enable fastening of the lip to the truck at a minimum of three appropriately spaced locations.

The purpose of the attachment lip 12 is to provide a fastening edge to solidly connect the upper mounting plate 10 to the cargo bed sidewall 18 by bolts, screws or the like. The upper mounting plate is additionally and optionally fastenable by a bolt 16 placed through the horizontal surface of the plate and extending into stake sleeves 14. The bolt is of sufficient length to penetrate the plate and extend down through the bottom of the stake sleeve 14. These stake sleeves are commonly installed by the truck's manufacturer in the cargo bed sidewall 18.

The upper mounting plates 10 are mounted on the sidewall so that they extend past the rear end of the sidewall 18, allowing sufficient clearance for the hinging mechanism at the tailgate to operate properly. At the rearward end of the upper mounting plates 10, there is a fixed upper hinge sleeve 20 connected rigidly (e.g. welded). This sleeve is configured to co-operate with a corresponding hinge sleeve 26 attached to the lower mounting plates 22.

Each lower mounting plate 22 is configured to fit on the top of the vehicle's bumper 24 and is secured to the bumper by fastening means such as bolts, screws or the like. The upper side of the lower mounting plate 22 has a fixed lower hinge sleeve 26 connected rigidly thereto. The lower mounting plate 22 is secured in place on the bumper so that the lower hinge sleeve 26 is positioned directly below the corresponding upper hinge sleeve 20 in each upper plate.

Figure 2:
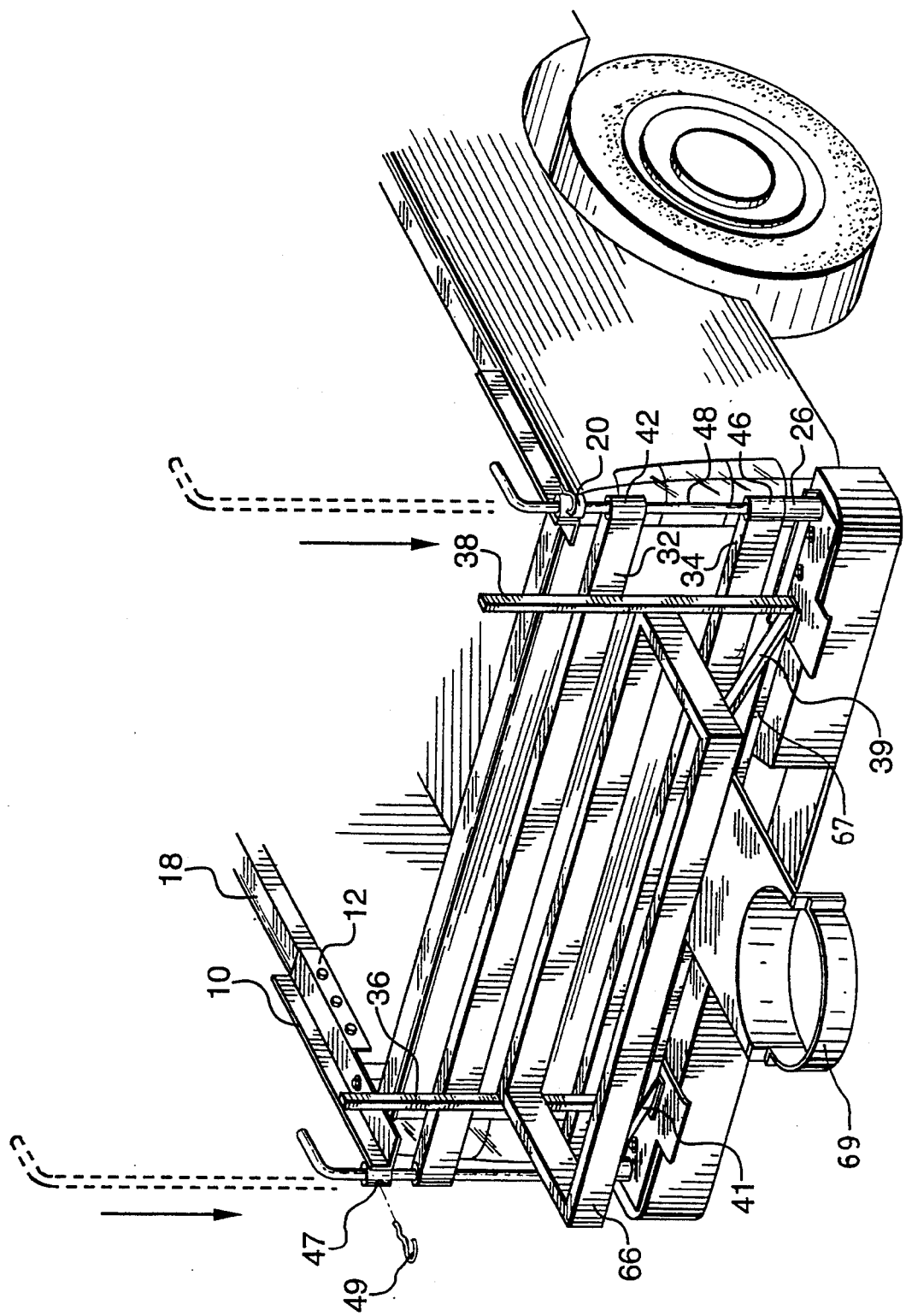
FIG. 2 is a perspective view of the mounting assembly attached to a vehicle.
Figure 4:
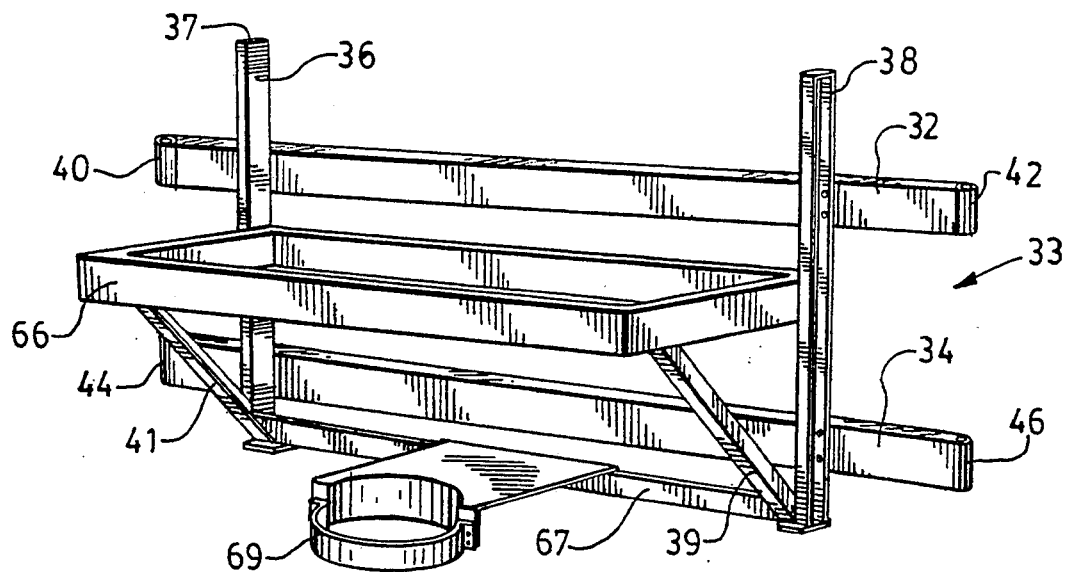
FIG. 4 is a perspective view of frame portion of the mounting assembly.

Referring now to FIGS. 2 and 4, the frame for the hopper will be described. The frame can be seen to comprise a swing carriage 33, an attached hopper mounting support 37 and a spreader guard 69.

The swing carriage 33 is comprised of upper and lower support beams, 32 and 34 respectively. These beams are spaced and held in place by means of two upright members, 36 and 38, which are components of the hopper mounting support 37. At both ends of each support beam, 32 and 34, there are rigidly connected hinge sleeves 40, 42, 44 and 46. These hinge sleeves are similar to the sleeves 20 and 26 connected to the mounting plates 10, 22 and are positioned so that both hinge sleeves on each side of the swing carriage fall directly in line between the upper and lower hinge sleeves on the corresponding mounting plates. In order that this can be accomplished, the length of the support beams comprising the swing carriage 33 is governed by truck manufacturer's standard cargo box width. The lower support beam hinge sleeves 44 and 46 rest on top of the lower mounting plate hinge sleeves and provide vertical support to the swing carriage 33.

The hopper mounting support 37 defines a generally rectangular frame 66 of sufficient size to accommodate the hopper 68. The rectangular frame 66 is fastened to upright members 36 and 38 and is supported by means of two diagonal struts 39 and 41. Vertical support is provided to the hopper 68 by means of a ledge molded around the hopper perimeter which seats on the rectangular frame 66.

A spreader guard 69 attaches to a cross member 67 which stretches between the base of upright members 36 and 38. The spreader guard provides protection from the external spinner 70 used to dispense the salt onto the roadway, which is located at the base of the hopper 68.

The entire frame is attached to the vehicle attachment means by the pivoting means, which is provided by a pivoting or hinging mechanism. While this pivoting or hinging mechanism is provided on both sides of the assembly in the embodiments described herein, it is obvious that manufacturing of the salt spreader mounting assembly might also be accomplished with a pivoting or hinging mechanism placed on only one side. This dual-sided hinging provides maximum convenience and versatility to the operator. However, costs of manufacture could be reduced using hinging means on only one side, with an appropriately modified frame assembly.

The pivoting or hinging means can also take a variety of configurations, three of which will be described in detail below. For the following configurations, it should be assumed that the hinging means is identical on both sides of the assembly.

Referring to FIG. 2, a first hinging means comprises a full length hinge pin 48 formed with a diameter to fit snugly through, in order from top to bottom, the upper mounting plate hinge sleeve 20, the upper support beam hinge sleeve 42, the lower support beam hinge sleeve 46, and finally through the lower mounting plate hinge sleeve 26. The top of the hinge pin 48 has a 90 degree bend to facilitate turning and removal during operation. (Again both sides of the assembly are identical and only one side will be described.) Both hinge pins may be locked in place by means of a cotter pin 49 or the like placed through a machined hole 47 in the hinge pin and the upper or lower mounting plate hinge sleeve.

Figure 7:
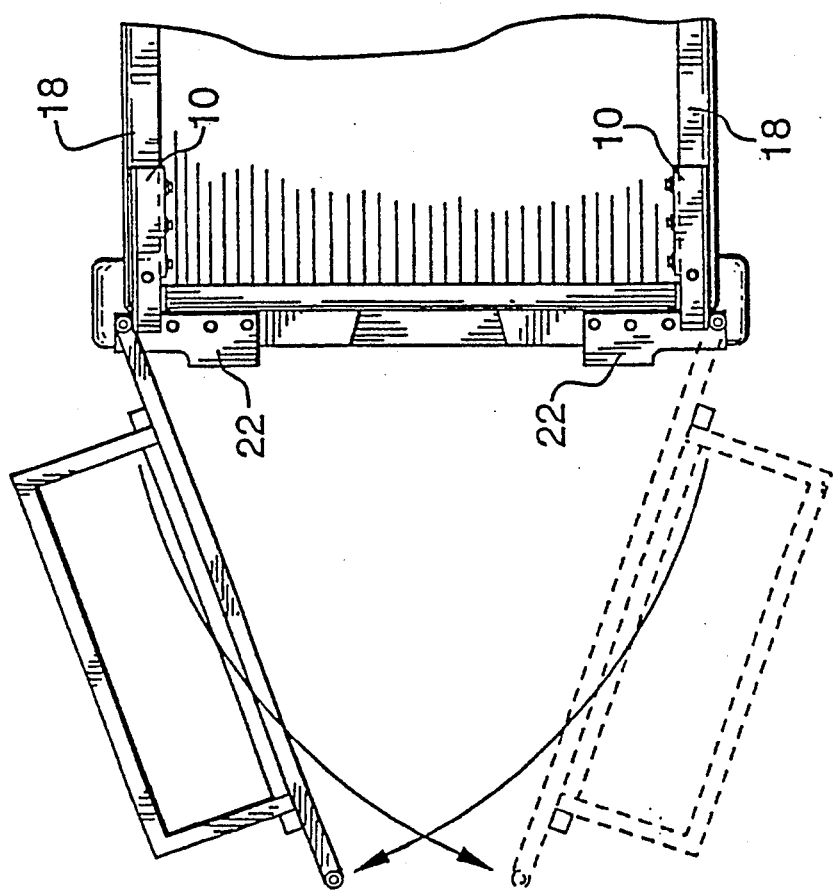
FIG. 7 is a top view of the mounting assembly shown in the swung open position.

Referring to FIG. 7, in operation, a hinge pin may be removed from either side of the apparatus freeing one end of the swing carriage 33. The swing carriage can then be swung in the horizontal plane about the opposing hinge pin in order to gain access to the rear of the vehicle's cargo bed via the tailgate.

Figure 8:
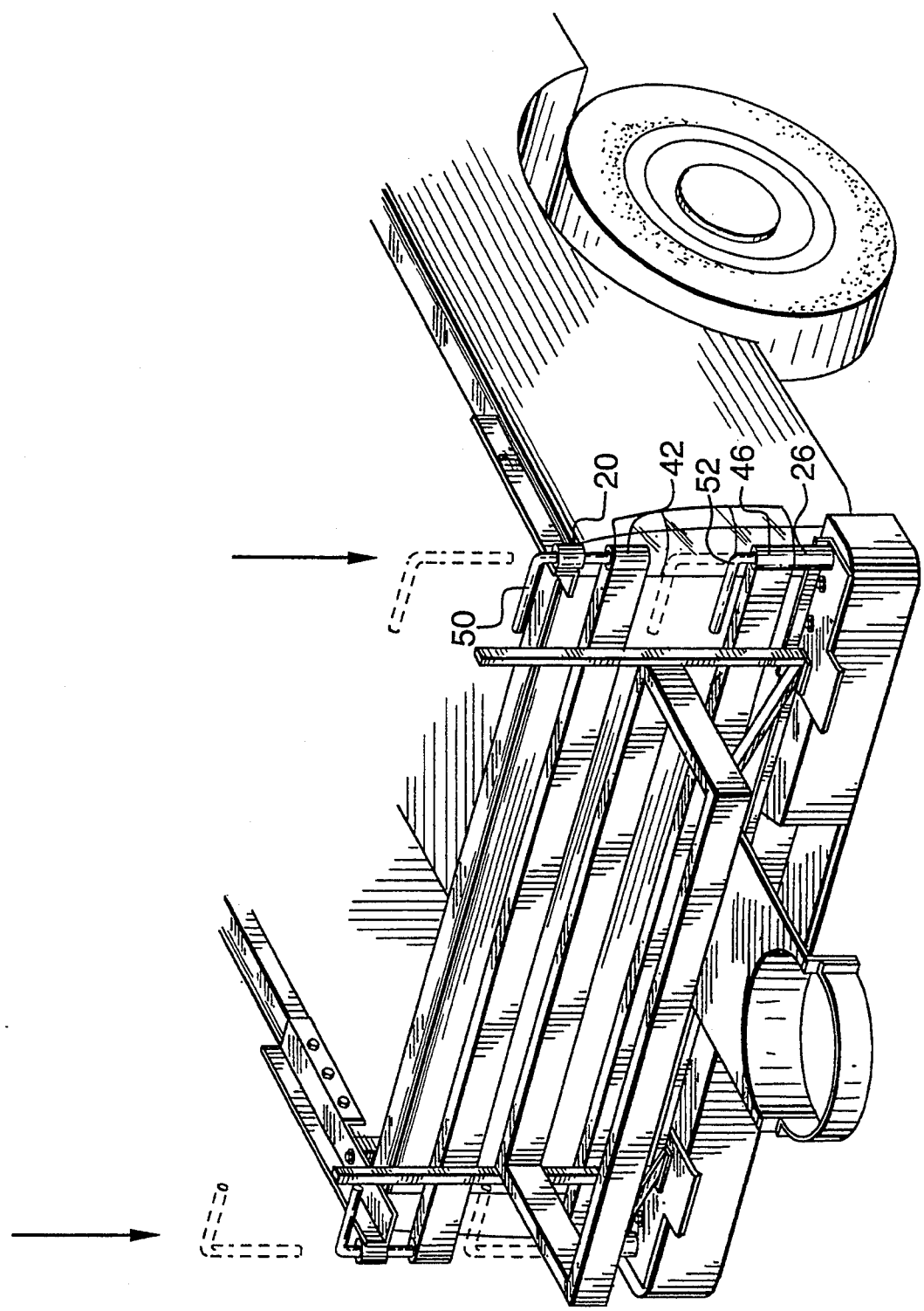
FIG. 8 is a perspective view of another embodiment showing an alternative pivoting mechanism.

Referring to FIG. 8, another hinging system is shown using two shorter hinge pins on each side as opposed to one longer pin. An upper hinge pin 50 has sufficient length to enter the upper mounting plate hinge sleeve 20 and clear the bottom of the upper support beam hinge sleeve 42. The lower hinge pin 52 has sufficient length to enter the lower support beam hinge sleeve 46 and extend to the bottom of the lower mounting plate hinge sleeve 26. The top of each hinge pin has a 90 degree bend to facilitate turning and removal during operation, as well as to prevent the hinge pins from slipping through the hinge sleeves. As before, the upper and lower hinge pins may be locked in place by means of a cotter pin (not shown).

Referring to FIGS. 9 through 12, a third hinging system can be seen which utilizes swivelling hinge sleeves, 58 and 60 respectively, on the upper and lower mounting plates. A swivelling hinge sleeve features two concentric rings with machined slots in a portion of the circumference of sufficient size to accommodate a corresponding hinge pin 55. The outer ring 54 is static and allows the inner ring 53 to rotate inside it by means of a sleeve bearing or the like. The inner ring 53 has a handle 56 extending outwardly at a 90 degree angle from the top of its slot to facilitate turning. In this configuration, swivelling hinge sleeves 58 and 60 replace the static upper and lower mounting plate hinge sleeves 20 and 26. Upper and lower support beam hinge sleeves 28 and 30 are replaced by upper and lower support beam hinge pins 62 and 64 respectively.

Referring to FIG. 12, in operation, upper and lower swivelling hinge sleeves 58 and 60 can be unlocked by rotation, such that the machined slots in their inner and outer rings are matched, permitting the removal of the upper and lower support beam hinge pins 62 and 64 respectively. This side of the swing carriage 33 can then be swung in the horizontal plane about the opposing set of hinge pins and sleeves in order to gain access to the rear of the vehicle's cargo bed via the tailgate.

It will be appreciated that the above description relates to the preferred embodiments by way of example only. Many variations on the invention will be obvious to those knowledgeable in the field, and such obvious variations are within the scope of the invention as described and claimed, whether or not expressly described.

What is claimed as the invention is:

1. A salt spreading assembly for mounting on a vehicle, where the vehicle has a cargo bed and sidewalls rising vertically from opposite side edges of the cargo bed and extending to a rear end of said cargo bed, said salt spreading assembly comprising:

mounting means securable to said vehicle at opposite sides of said cargo bed;

a frame assembly running laterally between said mounting means rearward from said sidewalls, said frame assembly including connection means for releasable connection to said mounting means laterally outward from inner edges of said sidewalls, each connection means being pivotable about a substantially vertical axis, whereby releasing said connection means on either side of said frame assembly permits said frame assembly to be swung away from said cargo bed, about the vertical axis of the connection means on the other side, thereby permitting free access to said cargo bed and permitting a tailgate mounted between said sidewalls to be folded down; and a hopper and spreader assembly mounted on said frame assembly and extending rearwardly therefrom.

2. A salt spreading assembly as recited in claim 1, where said mounting means comprises upper and lower mounting brackets at each side, and where said connection means comprises vertical-axis sleeves on said frame assembly and on each said mounting bracket, and pins passing through said sleeves, said pins being releasably secured in place.

3. A salt spreading assembly as recited in claim 2, where each side has a single pin passing through each said sleeve on that side, whereby that side may be released by removal of that single pin.

* * * * *